/2

3,517,010
5-ACETAMIDO-4-PYRIMIDINECARBOXYLIC
ACIDS AND RELATED COMPOUNDS
Dong H. Kim, Wayne, and Arthur A. Santilli, Havertown,
Pa., assignors to American Home Products Corporation, New York, N.Y., a corporation of Delaware
No Drawing. Filed Apr. 5, 1968, Ser. No. 719,241
Int. Cl. C07d 51/42
U.S. Cl. 260—256.4
9 Claims

ABSTRACT OF THE DISCLOSURE

This invention concerns 5-acetamido-4-pyrimidinecarboxylic acids, 5-acetamido-4-pyrimidine-carboxylic acid esters and 5-amino-4-pyrimidinecarboxylic acid esters which are pharmacologically active as central nervous system depressants. Further, this invention relates to 5-(2,2,2-trifluoroacetamido)-4-pyrimidinecarboxylic acid esters which are useful intermediates in the preparation of their corresponding 5-amino-4-pyrimidinecarboxylic acid esters.

The present invention relates to pyrimidinecarboxylic acids. More particularly, it concerns 5-acetamido-4-pyrimidinecarboxylic acids, the esters thereof and 5-amino-4-pyrimidine-carboxylic acid esters which in standard and accepted pharmacological tests have demonstrated activity as central nervous system depressants. Further, it concerns 5-(2,2,2-trifluoroacetamido)-4-pyrimidinecarboxylic acid which are useful intermediates in the preparation of these 5-amino-4-pyrimidinecarboxylic acid esters.

The new and novel compounds within the scope of the present invention are represented by the following structural formula:

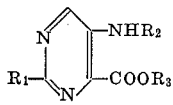

wherein $R_1$ is selected from the group consisting of lower alkyl, phenyl, halophenyl, lower alkylphenyl and lower alkoxyphenyl; $R_2$ is selected from the group consisting of hydrogen, trifluoroacetyl and acetyl; and $R_3$ is selected from the group consisting of hydrogen and lower alkyl with the proviso that when $R_2$ is hydrogen and trifluoroacetyl $R_3$ is alkyl. As employed herein the terms "lower alkyl" and "lower alkoxy" are meant to include both branched and straight chain moieties having from one to about eight carbon atoms. Typical examples thereof are: 5-amino-2-phenyl-4-pyrimidinecarboxylic acid, ethyl ester; 5-amino-2-(m-chlorophenyl)-4-pyrimidinecarboxylic acid, ethyl ester; 5-amino-2-phenyl-4-pyrimidinecarboxylic acid, methyl ester; 5-acetamido-2-phenyl-4-pyrimidinecarboxylic acid; 5-acetamido-2-(m-chlorophenyl)-4-pyrimidinecarboxylic acid; 5-acetamido-2-phenyl-4-pyrimidinecarboxylic acid, ethyl ester; 5-(2,2,2-trifluoroacetamido)-4-pyrimidinecarboxylic acid, ethyl ester; and 2-(m-chlorophenyl)-5-(2,2,2-trifluoroacetamido)-4-pyrimidinecarboxylic acid, ethyl ester.

The new and novel 5-acetamido-4-pyrimidinecarboxylic acids of the present invention may be prepared by the reaction which is hereinafter schematically exemplified:

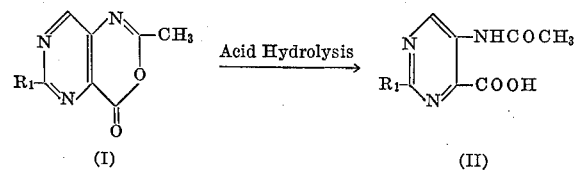

wherein $R_1$ is defined as above. This acidic hydrolysis is effected by contacting an appropriate 2-methyl-6-substituted-4H-pyrimido[5,4-d][1,3]oxazin-4-one (I) with about a 40 to about a 60 percent acetic acid solution at about reflux temperatures for a period of about one-half to about three hours. Preferably this reaction is conducted with 50% acetic acid at the reflux temperature of the reaction mixture for a period of about one hour.

When the acidic hydrolysis is complete, the resulting 5-acetamido-4-pyrimidinecarboxylic acid (II) is separated by standard recovery procedures e.g. the reaction mixture is chilled and the resulting precipitate is collected and recrystallized from a suitable solvent e.g. glacial acetic acid, an alkanol and water-dimethylformamide mixtures.

The new and novel 5-acetamido-4-pyrimidinecarboxylic acid esters and the 5-(2,2,2-trifluoroacetamido)-4-pyrimidinecarboxylic acid esters of the present invention may be prepared by the process illustrated by the following reaction scheme:

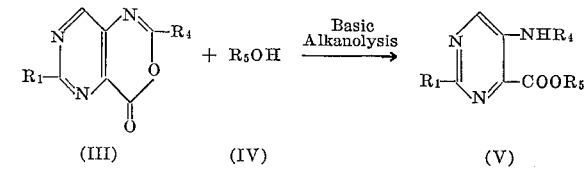

wherein $R_1$ is defined as above, $R_4$ is selected from the group consisting of methyl and trifluoromethyl and $R_5$ is lower alkyl. This basic alkanolysis is effected by contacting an appropriate 2,6-disubstituted-4H-pyrimido[5,4-d][1,3]oxazin-4-one (III) with an alkanol, in the presence of a catalytic amount of the corresponding alkali metal alkoxide, at about reflux temperatures for a period of about five minutes to about one hour.

When the basic alkanolysis recation is complete, the resulting product (V) (either a 5-acetamido-4-pyrimidine-carboxylic acid ester or a 5-(2,2,2-trifluoroacetamido)-4-pyrimidinecarboxylic acid ester) is recovered by conventional separation procedures, for example, the reaction mixture is concentrated, chilled and the resulting precipitate recrystallized from an appropriate solvent, such as, an alkanol and water-dimethylformamide mixtures. It should be noted that the product (V) prepared by the above procedure will be in the form of the ester that corresponds to the alkanol reactant e.g. if ethanol is employed the product (V) will be the appropriate ethyl ester. In this regard, it should also be noted that if an alkanol is employed to recrystallize the product (V), the alkanol utilized should correspond to the ester being recrystallized e.g. the methyl ester is recrystallized from methanol, to avoid a possible ester exchange during the recrystallization procedure.

The new and novel 5-amino-4-pyrimidinecarboxylic acid esters of the present invention may be prepared by the process which is depicted by the following reaction sequence:

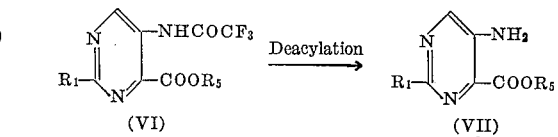

wherein $R_1$ and $R_5$ are defined as above. The deacylation is effected by contacting an appropriate 5-(2,2,2-trifluoroacetamido)-4-pyrimidinecarboxylic acid ester (VI) in its corresponding alkanol e.g. the ethyl ester in ethanol, with dry hydrochloric acid gas for about one to about two hours at about room temperature. Thereafter, the reaction mixture is chilled, basified with an alkali metal hydroxide, extracted with a water-immiscible organic solvent, e.g. ether, chloroform and the like, evaporated and the product (VII), a 5 - amino-4-pyrimidinecarboxylic acid ester recrystallized from a suitable solvent, such as, cyclohexane, cyclohexane - benzene, benzene-petroleum ether, and alkanol-water mixtures.

The starting compounds employed in the above described process, both the 2 - methyl - 6 - substituted-4H-pyrimido[5,4-d][1,3]oxazin - 4 - ones and the 2-trifluoromethyl - 6 - substituted - 4H-pyrimido[4,5-d][1,3]oxazin-4-ones are prepared by the procedure disclosed in copending United States patent application, Ser. No. 719,238, entitled "2,6 - Disubstituted - 4H - Pyrimido[5,4-d][1,3] Oxazin-4-Ones," by Dong H. Kim and Arthur A Santilli, filed in the United States Patent Office on the same day as the subject application. The other materials employed in the above described processes are commercially available or as easily prepared by procedures well known in the chemical art.

The 5 - acetamido - 4 - pyrimidinecarboxylic acids, the 5 - acetamido - 4 - pyrimidinecarboxylic acid esters and the 5 - amino - 4 - pyrimidinecarboxylic acid esters of the present invention possess valuable pharmacological activity. In particular, these compounds in standard pharmacological procedures demonstrate central nervous system activity and are useful as depressant agents to produce a calming effect.

In the pharmcological evaluation of the central nervous system depressant compounds of this invention the in vivo effects of the compounds of this invention were tested by the procedure described by Turner, in Screening Methods in Pharmacology, Academic Press, New York, p. 80 (1965) in the section entitled, "A Test for Central Depressants."

When the 5 - acetamido - 4 - pyrimidinecarboxylic acids, the 5 - acetamido - 4 - pyrimidinecarboxylic acid esters and the 5 - amino - 4 - pyrimidinecarboxylic acid esters of the present invention are administered either orally or intraperitoneally to mice as a one percent suspension emulsified with polyethylene oxide sorbitan monooleate, they induce decreased motor activity and decreased respiration at an oral or intraperitoneal dosage range from 127 mg./kilo to 400 mg./kilo. There were no deaths in the test animals at the highest oral and intraperitoneal dose used, 400 mg./kg.

The new and novel 5 - (2,2,2 - trifluoroacetamido)-4-pyrimidinecarboxylic acid esters of the present invention are useful and have utility as intermediates in the preparation of their corresponding pharmacologically active 5-amino-4-pyrimidinecarboxylic acid esters.

When the compounds of this invention are employed as central nervous system depressants in warm-blooded animals e.g. mice, rats, rabbits, guinea pigs, cats, dogs, monkeys and the like they may be administered alone or in combination with pharmacologically acceptable carriers, the proportion of which is determined by the solubility and chemical nature of the compound, chosen route of administration and standard biological practice. For example, they may be administered orally as solids containing such excipients as starch, milk, sugar, certain types of clay and so forth. They may also be administered orally in the form of solutions or they may be injected parenterally. For parenteral adminstration they may be used in the form of a sterile solution containing other solutes, for example, enough saline or glucose to make the solution isotonic.

The dosage of the present pharmacologically active agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

Three grams of 2-methyl-6-phenyl-4H-pyrimido[5,4-d] [1,3]oxazin-4-one is added to 40 ml. of 50% acetic acid, and the resulting mixture is refluxed for one hour. Chilling of the reaction mixture causes precipitation of crystals which are collected on a filter to give 3.1 g. of product, M.P. 171–174° C. Recrystallization from glacial acetic acid affords 5-acetamido-2-phenyl-4-pyrimidinecarboxylic acid, M.P. 179–181° C.

Analysis.—Calc'd for $C_{13}H_{11}N_3O_3$ (percent): C, 60.69; H, 4.31; N, 16.34. Found (percent): C, 60.74; H, 4.51; N, 16.21.

In a similar manner, 2,6-dimethyl-4H-pyrimido[5,4-d] [1,3]oxain-4-one is converted to 5-acetamido-2-methyl-4-pyrimidinecarboxylic acid.

EXAMPLE II

Three grams of 6-(m-chlorophenyl)-2-methyl-4H-pyrimido[5,4-d][1,3]oxazin-4-one is added to 60 ml. of 50% acetic acid, and the resulting mixture was refluxed for one hour. Chilling of the reaction mixture causes precipitation which is collected and recrystallized from 95% ethanol to yield 5-acetamido-2-(m-chlorophenyl)-4-pyrimidinecarboxylic acid, M.P. 175–177.5° C.

Analysis.—Calc'd for $C_{13}H_{10}ClN_3O_3$ (percent): C, 53.53; H, 3.46; N, 14.41; Cl, 12.16. Found (percent): C, 53.42; H, 3.18; N, 14.35; Cl. 12.18.

Similarly, the following compounds are synthesized:

5-acetamido-2-ethyl-4-pyrimidinecarboxylic acid;

5 - acetamido - 2 - (p - chlorophenyl) - 4 - pyrimidinecarboxylic acid;

5 - acetamido - 2 - (m - ethylphenyl) - 4 - pyrimidinecarboxylic acid;

5 - acetamido - 2 - (p - methoxyphenyl) - 4 - pyrimidinecarboxylic acid;

5 - acetamido - 2 - (p - fluorophenyl) - 4 - pyrimidinecarboxylic acid; and

5 - acetamido - 2 - (p - butylphenyl) - 4 - pyrimidinecarboxylic acid.

EXAMPLE III

To a refluxing mixture of 2-methyl-6-phenyl-4H-pyrimido[5,4-d][1,3]oxazin-4-one (1.6 g.) and absolute ethanol (45 ml.), there is added a catalytic amount of sodium ethoxide, whereby a clear solution was obtained. The solution is refluxed for ten minutes, then concentrated under reduced pressure. Chilling of the concentrated solution causes precipitation of product which is collected on a filter. The product weighs 1.7 g. and melts at 145–150° C. Recrystallization from 95% ethanol affords 5-acetamido-2-phenyl-4-pyrimidinecarboxylic acid, ethyl ester, M.P. 147.5–149° C.

Analysis.—Calc'd for $C_{15}H_{15}N_3O_3$ (percent): C, 63.15; H, 5.30; N, 14.70. Found (percent): C, 63.22; H, 5.34; N, 14.60.

EXAMPLE IV

Repeating the procedure of Example III to react an appropriate 2-methyl-4H-pyrimido[5,4-d] [1,3] oxazin-4-one with analkanol in the presence of an alkali metal alkoxide the following compounds are prepared:

5 - acetamido - 2 - propyl-4-pyrimidinecarboxylic acid, methyl ester;

5 - acetamido - 2 -(p-bromophenyl - 4 - pyrimidinecarboxylic acid, ethyl ester;

5 - acetamido - 2 - (p - tolyl) - 4 - pyrimidinecarboxylic acid, propyl ester;

5 - acetamido - 2 - (p - isopropoxyphenyl) - 4 - pyrimidinecarboxylic acid, methyl ester;

5 - acetamido - 2 - (p - chlorophenyl) - 4 - pyrimidine-carboxylic acid, ethyl ester;

5 - acetamido - 6 - isobutyl - 4 - pyrimidinecarboxylic acid, methyl ester; and

5 - acetamido - 6 - (o - ethoxyphenyl) - 4 - pyrimidinecarboxylic acid, ethyl ester.

EXAMPLE V

To a refluxing mixture of 6-phenyl-2-trifluoromethyl-4H-pyrimido[5,4-d][1,3]oxazin-4-one (7.0 g) and absolute ethanol (70 ml.), there is added a catalytic amount of sodium ethoxide. The resulting solution is defluxed for a half hour, then concentrated under reduced pressure. Chilling of the concentrated solution causes precipitation of product which is collected and recrystallized from 95% ethanol to afford 7.5 g. of 2-phenyl-5-(2,2,2-trifluoroacetamido)-4-pyrimidinecarboxylic acid, ethyl ester, M.P. 136.5–138.5° C.

*Analysis.* — Calc'd for $C_{15}H_{12}F_3N_3O_3$ (percent): C, 53.10; H, 3.57; N, 12.39. Found (percent): C, 53.52; H, 3.33; N, 12.29.

Dry HCl gas is introduced into a mixture of 2-phenyl-5-(2,2,2 - trifluoroacetamido) - 4 -pyrimidinecarboxylic acid, ethyl ester (3.0 g.) and absolute ethanol (100 ml.) with stirring at room temperature for forty-five minutes. A clear solution is obtained in fifteen minutes. Chilling of the solution causes precipitation of crystals which are collected, ground to powder, and transferred to a separatory funnel containing 60 ml. of 1 N NaOH and 60 ml. of ether. After shaking the mixture vigorously, the ether layer is collected. The ether extraction was repeated three more times. The combined ether extracts are dried over magnesium sulfate, evaporated and the residue recrystallized from a cyclohexane-heptane mixture to yield 5-amino-2-phenyl-4-pyrimidinecarboxylic acid, ethyl ester, M.P. 80–82° C.

*Analysis.*—Calc'd for $C_{13}H_{13}N_3O_3$ (percent): C, 64.18; H, 5.39; N, 17.28. Found (percent): C, 64.22; H, 5.36; N, 17.50.

EXAMPLE VI

2 - (m - chlorophnyl) - 5 - (2,2,2 - trifluoroacetamido)-4-pyrimidincarboxylic acid, ethyl ester is prepared as in Example V from 3.4 g of 6-m-chlorophenyl-2-trifluoromethyl-4H-pyrimido[5,4-d] [1,3]oxazin-4-one, 50 ml. of absolute ethanol and a catalytic amount of sodium ethoxide. The reaction period is extended to one-half hour, and the product is separated by chilling the reaction mixture. The product weighs 3.3 g. and melts at 172–174° C.

*Analysis.*—Calc'd for $C_{15}H_{11}ClF_3N_3O_3$ (percent): C, 48.20; H, 2.97; N, 11.24. Found (percent): C, 48.49; H, 2.93; N, 11.50.

Dry HCl gas is introduced into a mixture of 2-(m-chlorophenyl) - 5 - (2,2,2 - trifluoroacetamido) - 4 - pyrimidine-carboxylic acid, ethyl ester (3.0 g.) and absolute ethanol (100 ml.) with stirring at room temperature for forty-five minutes. A clear solution is obtained in ten minutes. Chilling of the solution causes precipitation of crystals which are collected, ground to powder, and transferred to a separatory funnel containing 60 ml. of 1 N NaOH and 60 ml. of ether. After shaking the mixture vigorously, the ether layer is collected. The ether extraction is repeated three more times. The combined ether extract is dried over magnesium sulfate, evaporated and the residue recrystallized from absolute ethanol to yield 5-amino-2-(m-chlorophenyl)-4-pyrimidinecarboxylic acid, ethyl ester, 130–132° C.

*Analysis.*—Cal'cd for $C_{13}H_{12}ClN_3C_2$ (percent): C, 56.22; H, 4.36; N, 15.13; Cl, 12.87. Found (percent): C, 56.22; H, 4.05; N, 15.37; Cl, 12.95.

EXAMPLE VII

When the procedure of Examples V–VI is repeated to react an appropriate 2-trifluoromethyl-4H-pyrimido[5,4-d][1,3]oxazin-4-one with an alkanol, in the presence of an alkali metal alkoxide, the following 5-(2,2,2-trifluoroacetamido) - 4 - pyrimidinecarboxylic acid ester intermediates are prepared which are then converted to their corresponding hereinafter listed 5 - amino - 4 - pyrimidinecarboxylic acid ester products.

| Intermediates | Products |
| --- | --- |
| 5-(2,2,2-trifluoroacetamido)-2-methyl-4-pyrimidinecarboxylic acid, ethyl ester. | 5-amino-2-methyl-4-pyrimidinecarboxylic acid, ethyl ester. |
| 2-ethyl-5-(2,2,2-trifluoroacetamido)-4-pyrimidinecarboxylic acid, methyl ester. | 5-amino-2-ethyl-4-pyrimidinecarboxylic acid, methyl ester: |
| 2-(p-butylphenyl)-5-(2,2,2-trifluoroacetamido)-4-pyrimidinecarboxylic acid, propyl ester. | 5-amino-2-(p-butylphenyl)-4-pyrimidinecarboxylic acid, propyl ester. |
| 5-(2,2,2-trifluoroacetamido)-2-(p-fluorophenyl)-4-pyrimidinecarboxylic acid, methyl ester. | 5-amino-2-(p-fluorophenyl)-4-pyrimidinecarboxylic acid, methyl ester. |
| 5-(2,2,2-trifluoroacetamido)-2-(p-methoxyphenyl)-4-pyrimidinecarboxylic acid, ethyl ester. | 5-amino-2-(p-methoxyphenyl)-4-pyrimidinecarboxylic acid, ethyl ester. |
| 2-(m-ethylphenyl)-5-(2,2,2-trifluoroacetamido)-4-pyrimidinecarboxylic acid, methyl ester. | 5-amino-2-(m-ethylphenyl)-4-pyrimidinecarboxylic acid, methyl ester. |
| 2-(p-chlorophenyl)-5-(2,2,2-trifluoroacetamido)-4-pyrimidinecarboxylic acid, propyl ester. | 5-amino-2-(p-chlorophenyl)-4-pyrimidinecarboxylic acid, propyl ester. |

EXAMPLE VIII

A mixture obtained by adding 19.3 g. of 6-phenyl-2-trifluoromethyl - 4H - pyrimido[5,4 - d][1,3-oxazin-4-one to 200 ml. of absolute ethanoll containing a catalytic amount of sodium ethoxide is refluxed for fifteen minutes. After cooling to room temperature, dry HCl gas is introduced into the mixture with stirring for one and a half hours. The reaction mixture is allowed to stand at room temperature overnight. Thereafter, chilling the reaction mixture causes precipitation of crystals which are collected on a filter and washed with absolute ethanol. The free amine is obtained by treating the hydrochloride salt with 10% NaOH solution followed by ether extraction. Te product weighs 12.5 g. and is recrystallized from cyclohexane and a small amount of ethanol to yield 5 - amino - 2 - phenyl - 4 - pyrimidinecarboxylic acid, ethyl ester, M.P. 80–82° C.

*Analysis.*—Calc'd for $C_{13}H_{13}N_3O_3$ (percent): C, 64.18; H, 5.39; N, 17.28. Found (percent): C, 64.22; H, 5.36; N, 17.50.

EXAMPLE IX

5 - amino - 2 - phenyl - 4 - pyrimidinecarboxylic acid, methyl ester is prepared as in Example VIII from 6-phenyl - 2 - trifluoromethyl - 4H - pyrimido[5,4 - d][1,3]oxazin-4-one and absolute methanol. The analytical sample is recrystallized from cyclohexane and melts at 119.5–122° C.

*Analysis.*—Calc'd for $C_{12}H_{11}N_3O_2$ (percent): C, 62.87; H, 4.84; N, 18.33. Found (percent): C, 62.56; H, 4.62; N, 18.24.

What is claimed is:

1. A compound selected from the group consisting of those having the formula:

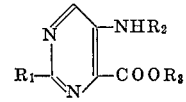

wherein $R_1$ is selected from the group consisting of lower alkyl, phenyl, halophenyl, lower alkylphenyl and lower alkoxyphenyl; $R_2$ is selected from the group consisting of hydrogen, trifluoroacetyl and acetyl; and $R_3$ is selected from the group consisting of hydrogen and lower alkyl with the proviso that when $R_2$ is hydrogen and trifluoroacetyl $R_3$ is lower alkyl.

2. A compound selected from the group consisting of those having the formula:

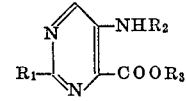

wherein $R_1$ is selected from the group consisting of lower alkyl, phenyl, halophenyl, lower alkylphenyl and lower alkoxyphenyl; $R_2$ is selected from the group consisting of hydrogen, and acetyl; and $R_3$ is selected from the group consisting of hydrogen and lower alkyl with the proviso that when $R_2$ is hydrogen $R_3$ is lower alkyl.

3. A compound as described in claim 2 which is 5-amino-2-phenyl-4-pyrimidinecarboxylic acid, ethyl ester.

4. A compound as described in claim 2 which is: 5-amino - 2 - (m-chlorophenyl) - 4 - pyrimidinecarboxylic acid, ethyl ester.

5. A compound as described in claim 2 which is: 5-amino - 2 - phenyl - 4 - pyrimidinecarboxylic acid, methyl ester.

6. A compound as described in claim 2 which is: 5-acetamido - 2 - phenyl - 4 - pyrimidinecarboxylic acid, ethyl ester.

7. A compound selected from the group consisting of those having the formula:

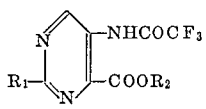

wherein $R_1$ is selected from the group consisting of lower alkyl, phenyl, halophenyl, lower alkylphenyl and lower alkoxyphenyl; and $R_2$ is lower alkyl.

8. A compound as described in claim 7 which is 5- (2,2,2 - trifluoroacetamido) - 2 - phenyl - 4 - pyrimidinecarboxylic acid, ethyl ester.

9. A compound as described in claim 7 which is 2- (m-chlorophenyl) - 5 - (2,2,2 - trifluoroacetamido) - 4-pyrimidinecarboxylic acid, ethyl ester.

References Cited

UNITED STATES PATENTS

| | | | |
|---|---|---|---|
| 3,022,306 | 2/1962 | Strube | 260—256.4 |
| 3,284,452 | 11/1966 | Schmidt et al. | 260—256.4 |

ALEX MAZEL, Primary Examiner

R. J. GALLAGHER, Assistant Examiner

U.S. Cl. X.R.

260—244; 424—251

PO-1050
(5/69)

UNITED STATES PATENT OFFICE
CERTIFICATE OF CORRECTION

Patent No. 3,517,010    Dated June 23, 1970

Inventor(s) Dong H. Kim and Arthur A. Santilli

It is certified that error appears in the above-identified patent and that said Letters Patent are hereby corrected as shown below:

Column 2, line 36, "recation" should read --reaction--;

Column 4, line 66, "analkanol" should read --an alkanol--;

Column 5, line 12, "defluxed" should read --refluxed--;

line 41, "(m-chlorophnyl)" should read --(m-chlorophenyl)--; and

Column 6, line 27, "absoute ethanoll" should read --absolute ethanol--.

SIGNED AND
SEALED
OCT 27 1970

(SEAL)
Attest:

Edward M. Fletcher, Jr.
Attesting Officer

WILLIAM E. SCHUYLER, JR.
Commissioner of Patents